United States Patent

Danzuka et al.

[11] Patent Number: 5,330,548
[45] Date of Patent: Jul. 19, 1994

[54] METHOD FOR PRODUCING GLASS PREFORM FOR OPTICAL FIBER

[75] Inventors: Toshio Danzuka; Masumi Ito; Ichiro Tsuchiya, all of Yokohama, Japan

[73] Assignee: Sumitomo Electric Industries, Ltd., Osaka, Japan

[21] Appl. No.: 913,965

[22] Filed: Jul. 17, 1992

[30] Foreign Application Priority Data

Jul. 19, 1991 [JP] Japan .................................. 3-179814
Apr. 9, 1992 [JP] Japan .................................. 4-088640

[51] Int. Cl.⁵ .......................................... C03B 37/023
[52] U.S. Cl. .................................. 65/3.12; 65/2; 65/32.1
[58] Field of Search .................. 65/2, 3, 11, 3.12, 32.1

[56] References Cited

U.S. PATENT DOCUMENTS 4,105,427  8/1978  Elmer ................................. 65/32.1

FOREIGN PATENT DOCUMENTS

| 0139532 | 5/1985 | European Pat. Off. . |
| 56-63833 | 5/1981 | Japan . |
| 61-58822 | 3/1986 | Japan . |
| 61-58823 | 3/1986 | Japan . |
| 61-58824 | 3/1986 | Japan . |
| 63-201025 | 8/1988 | Japan . |
| 64003024 | 1/1989 | Japan ..................... 65/32.1 |
| 21025 | 1/1990 | Japan . |
| 2067180 | 7/1981 | United Kingdom . |

*Primary Examiner*—Robert L. Lindsay
*Attorney, Agent, or Firm*—Cushman, Darby & Cushman

[57] ABSTRACT

A transparent glass preform for an optical fiber is produced by heating a glass soot preform to remove gas from the soot preform at a temperature at which the soot preform is not vitrified under reduced pressure, and then heating the preform at a temperature at which the preform is vitrified under reduced pressure, whereby the transparent glass preform containing no or little bubbles and having a uniform outer diameter is produced.

6 Claims, 4 Drawing Sheets

METHOD FOR PRODUCING GLASS PREFORM FOR OPTICAL FIBER

BACKGROUND OF THE INVENTION

Field of the Invention

The present invention relates to a method for producing a glass preform for use in the fabrication of an optical fiber.

Description of the Related Art

In a conventional method for producing a glass preform for an optical fiber, a glass soot preform is produced by a vapor phase synthesis method such as a VAD method or an OVD method and then vitrified by heating it in an electric furnace at a high temperature. Hitherto, this vitrification is carried out in an atmosphere of an inert gas such as helium, which optionally contains a small amount of a halogen gas (e.g. chlorine gas) under atmospheric pressure. However, in the conventional method, gas which is trapped between glass particles remains in the vitrified preform to form bubbles therein. Further, bubbles may be formed during heating at high temperature.

Recently, it is proposed to vitrify the glass soot preform under reduced pressure (cf. Japanese Patent Kokai Publication No. 201025/1988). By this method, the gas in the soot preform is removed by reduced pressure and it is expected that the gas does not remain in the vitrified preform.

In general, an apparatus for heating the soot preform under reduced pressure has a structure as shown in FIG. 1. That is, the heating apparatus comprises a uniform heating furnace having a muffle tube 12 which surrounds a glass soot preform 11 and a heater 12 which surrounds the muffle tube, a heat shield 14 and a vacuum container 15. The vacuum container is evacuated to the reduced pressure with a vacuum pump 17 through an outlet pipe 16. After evacuation, the heater temperature is raised to vitrify the soot preform 11 in the muffle tube.

Using the above heating apparatus, a soot preform was vitrified by raising temperature under the temperature condition shown in FIG. 2 up to a vitrification temperature of, for example, 1550° to 1650° C. But, in some cases, bubbles remained in the vitrified preforms unexpectedly. In addition, the vitrified preform had an irregular outer diameter in a longitudinal direction, for example, a larger diameter profile at both end parts and a smaller diameter at a middle part as shown in FIG. 3.

In the production of the glass preform, it is essential to reduce or completely remove the bubbles from the glass preform and make the outer diameter uniform.

SUMMARY OF THE INVENTION

One object of the present invention is to provide a method for producing a glass preform for an optical fiber, which method can reduce or completely remove bubbles from the glass preform.

Another object of the present invention is to provide a method for producing a glass preform for an optical fiber, which preform has a uniform outer diameter.

According to the present invention, there is provided a method for producing a glass preform for an optical fiber, comprising the steps of:

heating a glass soot preform to remove gas from said soot preform at a temperature at which said soot preform is not vitrified under reduced pressure, and then heating the preform from the above heating step at a temperature at which the preform is vitrified under reduced pressure.

Optionally, the soot preform which has been heated in the first heating step may be heated under reduced pressure at a temperature higher than the temperature in the first heating step and lower than the vitrification temperature, before the vitrification of the preform.

DETAILED DESCRIPTION OF THE DRAWINGS

According to the method of the present invention, all the heating steps are carried out under reduced pressure.

In the first heating step, a heating temperature is preferably from 900° to 1200° C., more preferably from 1000° to 1150° C., and heating is continued till the pressure is reduced to preferably 10 Pa or lower, for example, 5 to 10 Pa.

The heating step for vitrification is carried out at a temperature sufficient for vitrifying the preform, for example, from 1500° to 1600° C., under pressure of 10 Pa or lower for 1 to 60 minutes.

Before the first heating step, the soot preform is preferably treated under reduced pressure of 20 Pa or lower.

In the method of the present invention, a heating rate may have some influence on the quality of the glass preform. Up to the first heating temperature, the temperature is raised at a rate of 2° C./min. to 10° C./min., and from the end of the first heating step to the beginning of the heating step for vitrification, the temperature is raised at a rate of 1° C./min. to 4° C./min. This heating rate may be changed once or more. When the heating rate is changed, the heating rate after change is preferably smaller than that before change.

Further, between the first heating step and the heating step for vitrification, the temperature may be kept constant for a certain time in order to gradually shrink the preform.

The heating furnace is preferably purged, before heating, with an inert gas such as helium, nitrogen or argon to prevent oxidation of metal parts of the heating furnace.

The soot preform to be treated by the method of the present invention preferably has a bulk density of 0.1 to 0.9 g/cm$^3$. A soot preform having a bulk density smaller than 0.1 g/cm$^3$ is very soft and easily broken. It is difficult to degas a soot preform having a bulk density larger than 0.9 g/cm$^3$.

Figure 4:
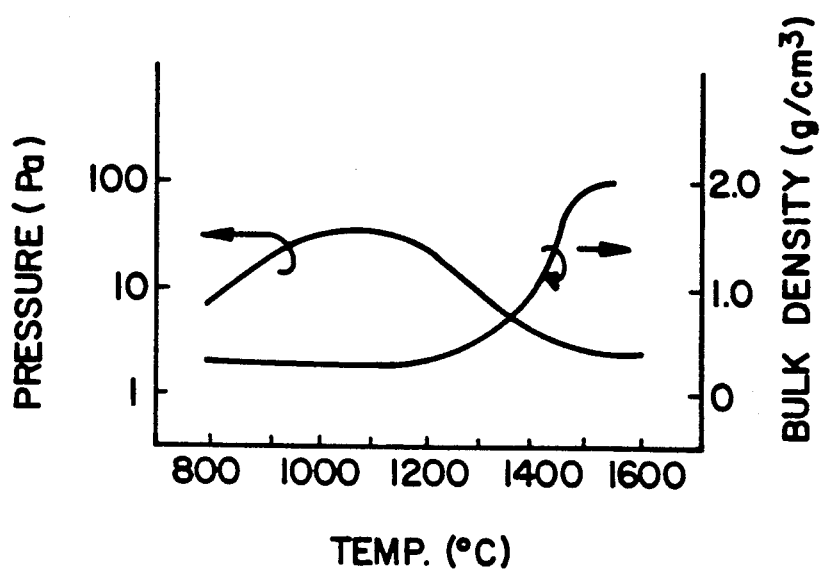
FIG. 4 shows the changes of the degree of reduced pressure and the bulk density when the glass soot preform is heated under reduced pressure at various temperatures.

Changes of the degree of reduced pressure and the bulk density were studied by heating the glass soot preform under reduced pressure. The results are shown in FIG. 4. As seen from FIG. 4, the degree of reduced pressure was worsened in the temperature range between 900° C. an 1200° C. due to degassing from the glass soot preform. The bulk density increased from 1200° C., and the vitrification began around 1550° C.

Using a glass composition consisting of a glass rod and glass soot deposited around the periphery of the glass rod, the following experiment was carried out.

Figure 5:
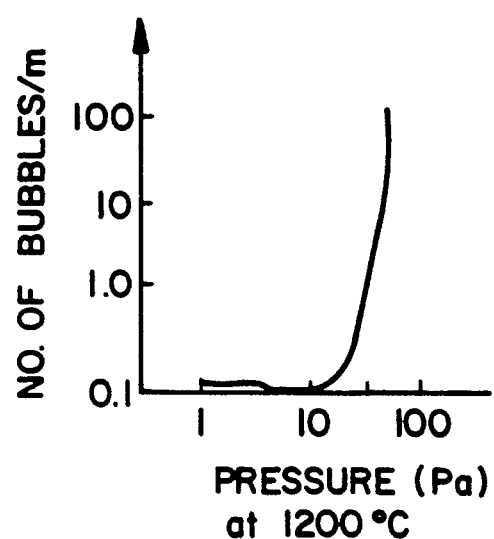
FIG. 5 shows a relationship between the number of the bubbles in the vitrified preform and the degree of reduced pressure.

The glass composite was treated at 1200° C. under reduced pressure and heated up to 1550° C. to vitrify it. Then, a relationship between a degree of reduced pressure reached at 1200° C. and the number of bubbles in the vitrified glass preform was studied. The results are shown in FIG. 5.

No or little bubbles remained in the glass preform when the preform was vitrified after the pressure was decreased to 10 Pa or lower. When the soot preform was heated and vitrified before the pressure reached 10 Pa, the number of bubbles increased greatly. The bubbles were mainly present around the periphery of the glass rod. When the number of the bubbles is small, they were individually observed as small bubbles. When the number of the bubbles was large, the preform was opaque.

From the above results, it is understood that it is essential to reduce the pressure to 10 Pa or lower in a temperature range between 900° and 1200° C. in which the gas is most effectively removed and then vitrify the soot preform.

Figure 6:
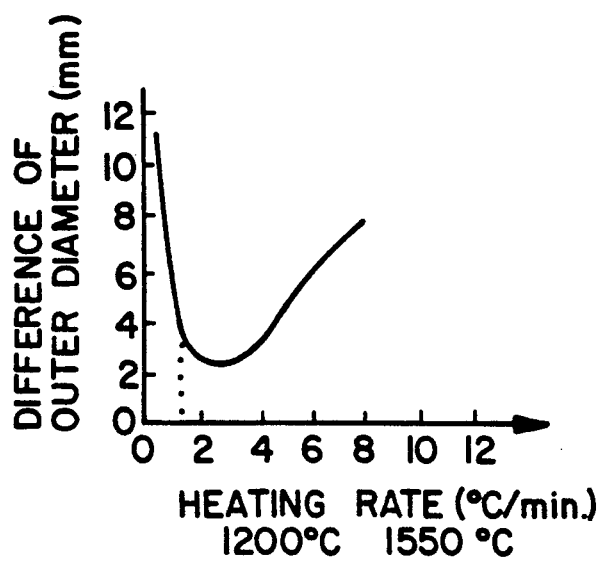
FIG. 6 shows a relationship between the outer diameter difference in the vitrified preform and the heating rate from the first heating temperature to the vitrification temperature.

In addition to the absence of bubbles in the preform, a uniform outer diameter of the vitrified preform is also important. As shown in FIG. 6, it was found that a heating rate between the first heating step and the heating step for vitrification has some influence on the uniformity of the outer diameter of the vitrified preform, namely a difference of the outer diameter between the lower end and the middle part of the preform. Between 1200° C. and 1550° C. the glass soot preform quickly shrinks. Since the lower end of the soot preform has a large surface area to be heated than the middle part, the former is more easily heated, that is, more easily shrinks than the latter. Therefore, the lower end has a larger diameter than the middle part of the glass preform. To avoid such diameter difference, it is important to gradually heat the soot preform while maintaining the temperature difference in the preform as small as possible. To produce the glass preform having good quality, the outer diameter difference should be 6 mm or less. To this end, the heating rate between the first heating step and the heating step for vitrification is preferably from 1° C./min. to 4° C./min. (see FIG. 6).

During this heating up period, the temperature may be kept at a constant temperature for a certain time period. Thereby, the more uniform heating of the preform is achieved.

When the preform is kept in the vitrification temperature of 1500° to 1600° C. for an unnecessarily long time, the glass preform is excessively softened and saggs by its own weight. Therefore, the preform is heated and vitrified in a time as short as possible. The heating time depends on the outer diameter and/or the bulk density of the preform. Usually, it is from 1 to 60 minutes.

Figure 7:
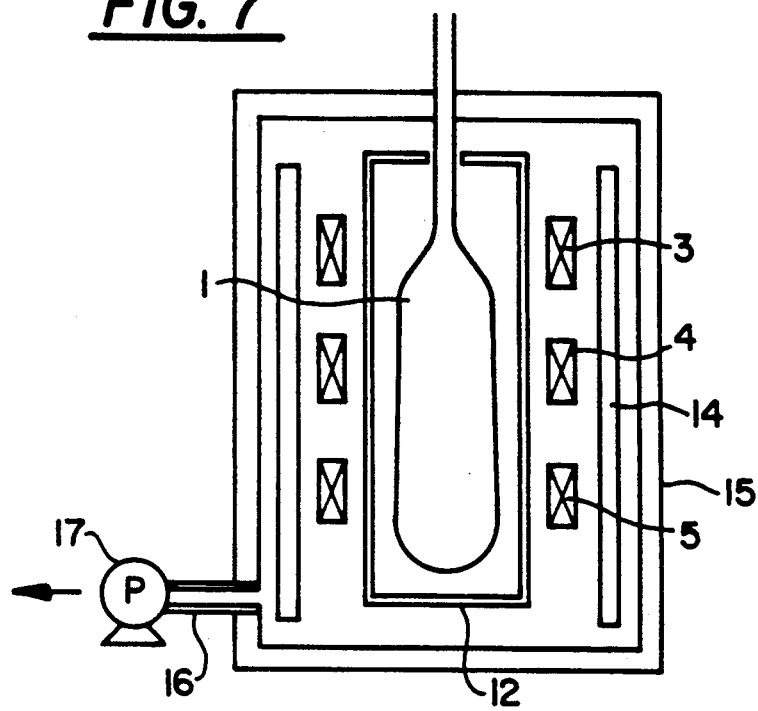
FIG. 7 is a schematic cross sectional view of one preferred embodiment of the heating furnace to be used according to the present invention.

To suppress the large diameter of the lower end of the preform, the heater preferably consists of two or more parts, for example, upper, middle and lower parts, and the temperature of the lower part is preferably equal to or lower than that of the other parts. In one embodiment of the apparatus for heating the preform used in the method of the present invention as shown in FIG. 7, the heater is divided into three parts 3, 4, 5.

In a step for heating the preform from room temperature to the temperature in the first heating step, it is preferably to pretreat the glass soot preform under pressure of 20 Pa or lower in view of maintenance of the heating furnace, since the glass soot preform contains water or acids such as hydrochloric acid.

Though the glass soot preform does not change at a temperature lower than 800° C., a care should be taken in the heating step from room temperature to 800° C. If the glass soot preform is heated suddenly in this temperature range, the gas trapped in the glass soot is abruptly emitted so that the preform may be broken. However, an excessively low heating rate is not preferred in view of productivity. A heating rate from room temperature to the temperature in the first heating step is preferably from 2° C./min. to 8° C./min.

The glass soot preform to be treated by the method of the present invention may be produced by any of the conventional methods such as the VAD method or the OVD method. Alternatively, minute glass particles having a particle size of 0.1 to 100 μm are compressed at an ambient or elevated temperature to form a porous glass preform. In addition, to the glass soot preform, a rare earth element or a dopant which alters a refractive index of the glass may be added by impregnation of a solution containing such component or thermal treatment.

Usually, the glass comprises $SiO_2$ which may contain a dopant such as $GeO_2$, $B_2O_3$, $P_2O_5$ or F, or a rare earth metal such as Er or Nd as described above.

A structure of the glass soot preform is not critical. For example, the glass soot preform consists of the glass soot only, has a multilayer structure having a lower refractive index at a peripheral layer than at a center part of the preform, or has a composite structure of a core rod of solid glass and an outer layer of the glass soot.

In the case of the composite structure preform, the core rod may be a quartz glass rod doped with a small amount of an impurity, or an intermediate preform consisting of a center part having a larger refractive index and a peripheral part having a lower refractive index.

PREFERRED EMBODIMENTS OF THE INVENTION

The method of the present invention will be illustrated by following Examples, which do not limit the scope of the present invention.

EXAMPLE 1

A glass soot preform which consisted of pure $SiO_2$ and was produced by the VAD method was vitrified according to the present invention. The glass soot preform had a diameter of 160 mm and a length of 700 mm.

After evacuating the preform down to 20 Pa at room temperature, it was inserted in a heating furnace shown in FIG. 7 and heated up to 1000° C. at a heating rate of 4° C./min. under pressure of 18 Pa. The pressure was reduced to 5 Pa after one hour at this temperature. Then, the temperature was raised to 1550° C. at a heating rate of 2° C./min., while the lowest part 5 of the heater was heated up to only 1500° C. During this heating step, the internal pressure of the furnace was constant at about 5 Pa. After reaching the maximum temperature, the same temperature was maintained for 5 minutes and then the temperature was lowered.

No bubble was seen along the entire length of the vitrified preform, and the outer diameter was 70±0.3 mm along the entire length of the preform.

COMPARATIVE EXAMPLE 1

Figure 1:
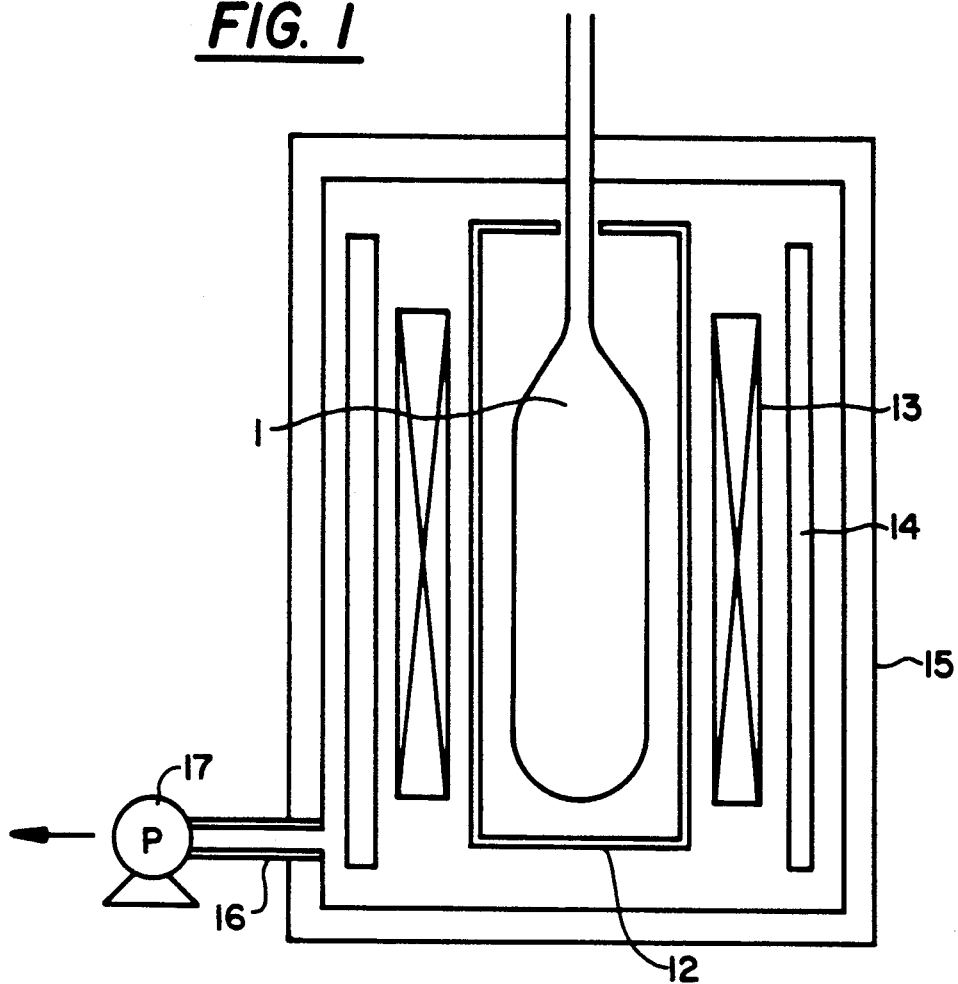
FIG. 1 is a schematic cross sectional view of a heating furnace for vitrifying a soot glass preform.
Figure 2:
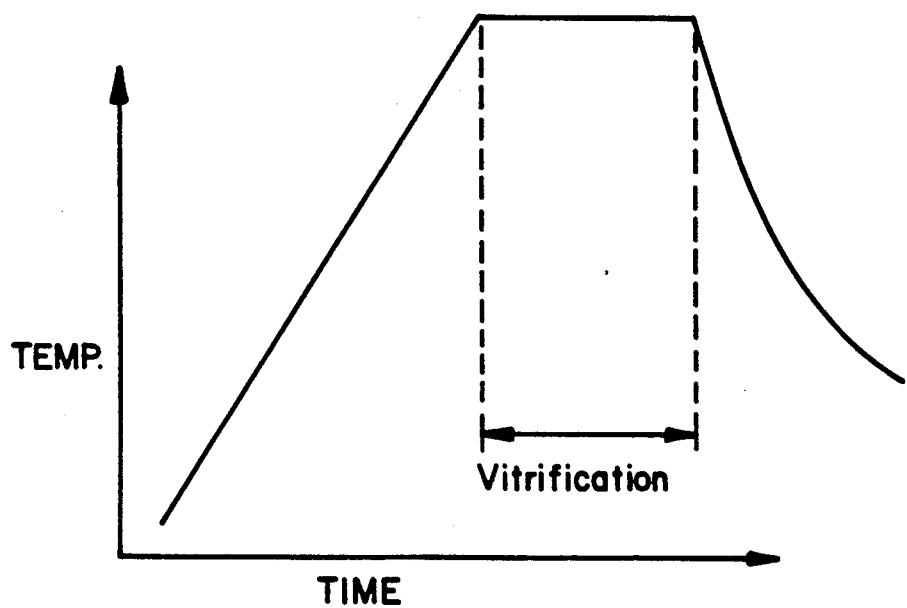
FIG. 2 shows a temperature condition in the conventional vitrification method of a glass preform.

The same glass soot preform as used in Example 1 was placed in the heating furnace of FIG. 1. The internal pressured was reduced to 20 Pa and the temperature was raised to 1600° C. at a heating rate of 8° C./min. and maintained at that temperature for 30 minutes. After cooling, the preform was removed from the furnace. The preform contained bubbles having a diameter of 0.1 mm or less along its entire length. The outer diameter of the middle part was 65 mm, while the outer diameter of the lower end part was 73 mm.

EXAMPLE 2

The same glass soot preform as used in Example 1 was evacuated down to 20 Pa at room temperature and inserted in the furnace of FIG. 7 which had been heated at 800° C. From 800° C. to 1100° C., the temperature was raised at a heating rate of 3° C./min. under pressure of 20 Pa. After maintaining those conditions for one hour, the pressure was decreased to 5 Pa. Then, the temperature was raised from 1100° C. to 1400° C. at a rate of 3° C./min. and from 1400° C. to 1550° C. at a rate of 2° C./min., while the lowest part of the heater was heated up to only 1520° C. After reaching the maximum temperature, the same temperature was maintained for 3 minutes and then the temperature was lowered. During these heating steps, the internal pressure was 5 Pa.

No bubble was seen along the entire length of the vitrified preform and the preform was transparent. The outer diameter was 68±0.3 mm along the entire length of the preform.

COMPARATIVE EXAMPLE 2

A glass soot preform which consisted of $SiO_2$ and produced by the VAD method was vitrified under reduced pressure. The glass soot preform had a diameter of 150 mm and a length of 800 mm.

The glass soot preform was inserted in the furnace of FIG. 1 and evacuated down to 5 Pa and the temperature was raised up to 1600° C. at a rate of 8° C./min. and maintained at the same temperature for 30 minutes. After lowering the temperature, the preform was removed from the furnace.

Figure 3:
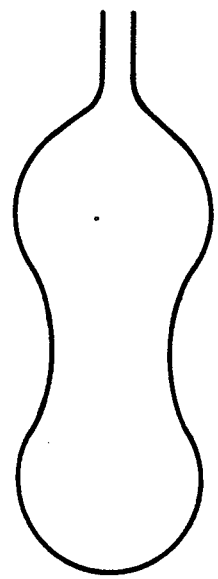
FIG. 3 is a schematic view of a glass preform which is vitrified by a conventional method.

The preform was greatly deformed as shown in FIG. 3, and the maximum diameter was 72 mm and the minimum diameter at the middle part was 64 mm. Among ten vitrified preforms, six contained the bubbles along their entire length, and all the preforms contained the bubbles at their top end parts.

EXAMPLE 3

The same glass soot preform as used in Comparative Example 2 was vitrified according to the present invention. The preform had the diameter of 150±2 mm and the length of 800 mm.

The soot preform was inserted in the furnace of FIG. 1 and evacuated down to 5 Pa. Then, the internal temperature was raised up to 1050° C. at a rate of 8° C./min., maintained at 1050° C. for 60 minutes, again raised up to 1350° C. at a rate of 8° C./min., maintained at 1350° C. for 60 minutes and then raised up to 1600° C. and maintained at 1600° C. for 30 minutes. After cooling, the preform was removed from the furnace.

No bubble was seen along the entire length of the vitrified preform, and the outer diameter was 68±0.5 mm along the entire length of the preform.

EXAMPLE 4

Figure 8:
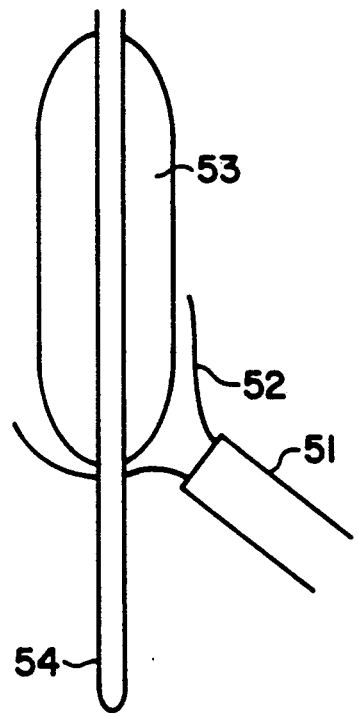
FIG. 8 schematically shows a method for providing a glass soot layer around a glass rod.

Around a glass rod 54 consisting of a $SiO_2$ core part which was doped with Ge and had a higher refractive index and an outer part made of pure $SiO_2$, a layer of glass soot 53 was deposited with a flame 52 generated by a burner 51 as shown in FIG. 8 to form a composite preform having an outer diameter of 156±1 mm and a length of 800 mm.

The composite preform was vitrified under the same conditions as in Example 3. The vitrified preform contained no bubbles and had an outer diameter of 69±0.4 mm.

From this vitrified preform, an optical fiber having good properties can be drawn.

COMPARATIVE EXAMPLE 3

The same glass soot preform as used in Comparative Example 2 was vitrified as follows:

The temperature was raised up to 1050° C. at a rate of 8° C./min., maintained at 1050° C. for 60 minutes, again raised up to 1600° C. at a rate of 8° C./min. and maintained at 1600° C. for 30 minutes. Then, the temperature was lowered. Though the vitrified preform had good transparency, its outer diameter fluctuated, and the maximum diameter was 73 mm and the minimum diameter was 64 mm.

COMPARATIVE EXAMPLE 4

The same glass soot preform as used in Comparative Example 2 was vitrified as follows:

The temperature was raised up to 1350° C. at a rate of 8° C./min., maintained at 1350° C. for 60 minutes, again raised up to 1600° C. at a rate of 8° C./min. and maintained at 1600° C. or 30 minutes. Then, the temperature was lowered. Though the fluctuation of the outer diameter of this preform was within 1 mm, the bubbles remained along its entire length.

EXAMPLE 5

The same glass soot preform as used in Example 3 was vitrified as follows:

The temperature was raised up to 1050° C. at a rate of 8° C./min., maintained at 1050° C. for 60 minutes, raised up to 1350° C. at a rate of 8° C./min., maintained at 1350° C. for 40 minutes and further raised up to 1450° C. at a rate of 6° C./min., maintained at 1450° C. for 30 minutes, then raised up to 1600° C. at a rate of 8° C./min. and maintained at 1600° C. for 5 minutes. Then, the temperature was lowered. The vitrified preform contained no bubbles and the fluctuation of its diameter was within 0.5 mm.

What is claimed is:

1. A method for producing a glass preform for an optical fiver, comprising the steps of:

heating a glass soot preform to remove gas from said soot preform at a temperature of from 900° to 1200° C. at which said soot preform is not vitrified under reduced pressure, continuing heating until the pressure is reduced to 10 Pa or lower, and then heating the preform from the above-heating step at a temperature of 1500° to 1600° C. under pressure of 10 Pa or lower for 1 to 60 minutes at which the preform is vitrified under reduced pressure.

2. The method according to claim 1, wherein said soot preform is heated from 800° C. to the temperature in the first heating step at a heating rate of 2° to 10° C./min.

3. The method according to claim 1, wherein the preform is heated from the temperature in the first heating step to the temperature in the heating step for vitrification at a heating rate of 1 to 4° C./min.

4. The method according to claim 3, wherein the heating rate is changed during the heating up step, and a heating rate after change is smaller than a heating rate before change.

5. The method according to claim 3, wherein the temperature is kept constant for a certain time during the heating up step from the temperature in the first heating step to the temperature in the heating step for vitrification.

6. The method according to claim 1, wherein a heater used for heating the preform consists of at least two parts, and the lower part is heated to a temperature lower than the upper part.

* * * * *